(12) United States Patent
Walker et al.

(10) Patent No.: US 7,426,268 B2
(45) Date of Patent: *Sep. 16, 2008

(54) SYSTEM AND METHOD FOR CALL ROUTING AND ENABLING INTERACTION BETWEEN CALLERS WITH CALLS POSITIONED IN A QUEUE

(75) Inventors: Jay S. Walker, Ridgefield, CT (US); James A. Jorasch, Stamford, CT (US); Thomas M. Sparico, New York, NY (US); Robert C. Tedesco, Huntington, CT (US)

(73) Assignee: Walker Digital, LLC, Stamford, CT (US)

( * ) Notice: Subject to any disclaimer, the term of this patent is extended or adjusted under 35 U.S.C. 154(b) by 401 days.

This patent is subject to a terminal disclaimer.

(21) Appl. No.: 10/843,239

(22) Filed: May 11, 2004

(65) Prior Publication Data

US 2004/0208307 A1 Oct. 21, 2004

Related U.S. Application Data

(63) Continuation-in-part of application No. 10/160,552, filed on Oct. 25, 2001, now Pat. No. 6,735,300, which is a continuation of application No. 09/616,016, filed on Jul. 13, 2000, now Pat. No. 6,314,178, which is a continuation of application No. 09/401,471, filed on Sep. 22, 1999, now Pat. No. 6,125,178, which is a continuation of application No. 08/832,724, filed on Apr. 11, 1997, now Pat. No. 5,978,467.

(51) Int. Cl.
*H04M 3/00* (2006.01)

(52) U.S. Cl. .................... 379/266.01; 379/265.13; 379/203.01

(58) Field of Classification Search .............. 379/88.11, 379/265.13, 266.01, 202.01–206.01
See application file for complete search history.

(56) References Cited

U.S. PATENT DOCUMENTS

| 4,788,715 | A |   | 11/1988 | Lee .............................. 379/84 |
|---|---|---|---|---|
| 5,020,095 | A |   | 5/1991 | Morganstein et al. ......... 379/67 |
| 5,299,260 | A | * | 3/1994 | Shaio ..................... 379/266.07 |
| 5,444,774 | A |   | 8/1995 | Friedes ....................... 379/266 |
| 5,479,487 | A | * | 12/1995 | Hammond ............... 379/88.22 |
| 5,483,588 | A |   | 1/1996 | Eaton et al. ................. 379/202 |
| 5,511,112 | A |   | 4/1996 | Szlam ........................... 379/88 |

(Continued)

OTHER PUBLICATIONS

Dreyfus, Suelette, "NSA Patents New Technology to Monitor Millions of Phone Calls", Nov. 17, 1999, (http //www abovetopsecret com/pages/nsapatent html).

(Continued)

*Primary Examiner*—Fan Tsang
*Assistant Examiner*—Simon Sing
(74) *Attorney, Agent, or Firm*—Walker Digital Management, LLC

(57) ABSTRACT

According to at least one embodiment of the present invention, a method and apparatus are provided for enabling a caller on hold to listen to one or more ongoing calls. The method includes receiving an incoming call, determining a subject category and at least one keyword associated with the incoming call, and determining an ongoing call based on the subject category and the at least one keyword. In one embodiment, keywords associated with calls may be stored in a database.

81 Claims, 10 Drawing Sheets

U.S. PATENT DOCUMENTS

| | | | | |
|---|---|---|---|---|
| 5,515,421 A | | 5/1996 | Sikand et al. | 379/67 |
| 5,528,670 A | | 6/1996 | Elliot et al. | 379/89 |
| 5,535,256 A | * | 7/1996 | Maloney et al. | 379/309 |
| 5,561,707 A | | 10/1996 | Katz | 379/88 |
| 5,619,561 A | * | 4/1997 | Reese | 379/142.08 |
| 5,710,591 A | * | 1/1998 | Bruno et al. | 348/14.09 |
| 5,802,163 A | * | 9/1998 | Miloslavsky | 379/266.09 |
| 5,848,143 A | * | 12/1998 | Andrews et al. | 379/265.09 |
| 5,937,422 A | | 8/1999 | Nelson et al. | 707/531 |
| 5,953,405 A | * | 9/1999 | Miloslavsky | 379/265.01 |
| 5,978,467 A | | 11/1999 | Walker et al. | 379/266 |
| 6,125,178 A | | 9/2000 | Walker et al. | 379/266 |
| 6,314,178 B1 | | 11/2001 | Walker et al. | 379/266.01 |
| 6,735,300 B2 | | 5/2004 | Walker et al. | 379/266 |

OTHER PUBLICATIONS

"Viecore—Speech Recognition is the Key to Better Customer Service", Edify Partner Case Study, Copyright 2003, Edify Corporation.

Myron, David, "Destination CRM com: Speech Recognition Gets Smarter", Mar. 23, 2003, (http www destinationcrm com/articles/default asp?ArticleID=2991).

Website: "iVoice 2.03.0 delivers caller interaction improvements with text-to-speech and speech recognition advances", Dec. 10, 2003, (http //search400 techtarget com/originalContent/0,289142,sid3_gci939422,00 html).

Website: "Microsoft Speech—Speech SDK 5.1 for Windows® applications", (http www Microsoft com/speech/download/sdk51), download date: Feb. 10, 2004.

Website: "Nuance Call Steering", (http //www nuance com/prodserv/callsteering html), download date: Feb. 10, 2004.

* cited by examiner

| CALL TRACKING NUMBER | CALL SUBJECT CATEGORY | CALL POSITION | CALLER PHONE NUMBER (ANI) | CHANNEL NUMBER | TIME CALL WAS RECEIVED | AGENT TRACKING NUMBER | MONITORED AGENTS | ARCHIVE CALL NUMBER |
|---|---|---|---|---|---|---|---|---|
| 1234ABC | MONITOR | 45 OF 130 | 203 555 2222 | | 7:30 AM | 456GFHJ | 1A-1F | |
| | | | | | | | | |
| | | | | | | | | |
| | | | | | | | | |

FIG. 4

| AGENT IDENTIFICATION NUMBER | AGENT STATUS | AGENT AREA OF EXPERTISE |
|---|---|---|
| 1A | OCCUPIED | MONITORS AND PRINTERS |
| | | |
| | | |

FIG. 5

| CALL SUBJECT CATEGORY | DATE OF RECORDED CALL | LENGTH OF RECORDED CALL | RECORDED CALL DATA |
|---|---|---|---|
| MONITORS | DECEMBER 22, 1996 | 32:21.3 | |
| | | | |
| | | | |

FIG. 6

| CALL TRACKING NUMBER 905 | CALL TYPE 910 | SUBJECT CATEGORY 915 | KEYWORDS DETECTED 920 |
|---|---|---|---|
| 1234599 | INCOMING | PRINTERS | INK, PHOTO |
| 1234555 | ONGOING | PRINTERS | INK, PHOTO |
| 1234544 | ONGOING | PRINTERS | POWER |
| 12234533 | ONGOING | MONITORS | BLINKING, CABLE |

FIG. 9

SYSTEM AND METHOD FOR CALL ROUTING AND ENABLING INTERACTION BETWEEN CALLERS WITH CALLS POSITIONED IN A QUEUE

The present application is a continuation-in-part of U.S. patent application Ser. No. 10/160,552, filed Oct. 25, 2001, issued May 11, 2004, as U.S. Pat. No. 6,735,300, entitled "METHOD AND APPARATUS FOR ENABLING INTERACTION BETWEEN CALLERS WITH CALLS POSITIONED IN A QUEUE"; which is a continuation of U.S. patent application Ser. No. 09/616,016, filed Jul. 13, 2000, issued Nov. 6, 2001, as U.S. Pat. No. 6,314,178 B1; which is a continuation of U.S. patent application Ser. No. 09/401,471, filed Sep. 22, 1999, issued Sep. 26, 2000, as U.S. Pat. No. 6,125,178; which is a continuation of U.S. patent application Ser. No. 08/832,724, filed Apr. 11, 1997, issued Nov. 2, 1999, as U.S. Pat. No. 5,978,467. Each of the above applications is incorporated by reference herein for all purposes.

FIELD OF THE INVENTION

The present invention relates to communication switching systems and, more specifically, to a queuing system for calls directed to a call center, wherein a caller can monitor other calls while awaiting an agent's response.

BACKGROUND OF THE INVENTION

For a growing number of public and private organizations, telephone-based customer support plays an increasingly vital role in activities requiring direct communication with a caller/customer. In order to serve a maximum number of callers, every call center is designed to optimize call handling efficiency and telephone agent productivity. Some prior art systems allow telephone agents to service a greater number of callers by a) ascertaining a caller's request through collection, by a live agent, of initial information from the caller, and b) transferring the call to a voice response unit to address the specific request of the caller. Other systems reverse the answer and collection process by connecting the caller initially to a voice response unit which collects information that is ultimately used to route the call to an appropriate agent.

While these techniques increase agent productivity, such systems are often limited to business transactions that are rather simple and clearly defined. For moderately complex applications, in which caller requests differ significantly from one caller to the next, semi-automated prior art systems may lead to disconnects, connection to a wrong agent pool, or a sequence of call transfers that may be disconcerting to some callers.

A common device used in telemarketing centers to enhance agent productivity is an Automatic Call Distributor (ACD) which allows a call center to cost-effectively handle a large number of calls by placing calls in a holding queue when no agents are available. Before a call is placed in the holding queue, a greeting message identifying the called party is played by the ACD, via an interactive voice response unit (IVRU), to the caller, indicating that the next available agent will service the call. During the holding period, music or advertising messages may be played to the caller to entertain or inform the caller of sales promotions for particular products or services.

Call queuing plays a very important role in call center operations. Known advantages to the call center include increased agent productivity by reduction of idle time for the agent, and increased capacity to handle more calls simultaneously during peak calling periods. Long call queues, however, have several disadvantages. Call centers waste a tremendous amount of money servicing long call queues. Callers waste time while in the queue, resulting in dissatisfaction with the service provided, potentially leading to abandoned calls. Further, for non-800 number calls, the user pays telecommunication charges while waiting.

It is known that many callers to call centers have identical or nearly identical queries but still obtain individual handling by agents. The prior art has attempted to handle such queries by providing pre-recorded answers to commonly asked questions. However, such a facility can provide less than satisfactory customer service, especially when the recorded answer does not precisely match the customer's query.

BRIEF DESCRIPTION OF THE DRAWINGS

FIG. 4 is a schematic drawing of the contents of a call database used in some embodiments of the invention.

FIG. 5 is a schematic drawing showing an agent database used with some embodiments of the invention.

FIG. 6 is a schematic diagram of a recorded call archive database used some embodiments of with the invention.

FIG. 9 is a table illustrating an example data structure of a keyword database for use in some embodiments of the present invention.

DETAILED DESCRIPTION OF THE INVENTION

Applicants have recognized that it may be advantageous, in accordance with some embodiments of the present invention, to provide a system for allowing a caller positioned in a queue to monitor one or more conversations of other callers. One or more embodiments of the present invention provide for determining which of a plurality of conversations might be more appropriate for the caller to monitor (e.g., based on the relevance of the conversation to the caller's need). In some embodiments, categories, keywords and/or other types of information about content available in the system may be used to determine the most relevant content.

Applicants further have recognized that it may be advantageous, in accordance with some embodiments of the present invention, to reduce the size of a call queue, thereby increasing customer satisfaction while directly decreasing the costs of the provider.

One or more embodiments of the present invention are directed to: queuing a call when no agent is available to service the call, giving the caller an option to monitor (but not participate in) other caller conversations with similar queries, querying a database using collected initial information as a search key(s) to retrieve additional information needed to find a similar caller currently being serviced, and connecting the caller to a communication channel to allow the monitoring of a call while not losing place in the queue for a next available agent.

Some embodiments of the present invention take advantage of the features and functionality offered by premise-based ACDs. In an exemplary embodiment of the invention, an ACD at the call center determines that no agents are available to handle an incoming call and invites the caller to be placed in an interactive holding queue. Upon receiving a signal indicating the caller's willingness to be placed in the queue, announcements are then played to the caller in order to collect initial information to direct the call. The collected information enables the system to search for a similar subject already being handled by an agent. If such a call is ongoing, the call is forwarded to a switch serving the agent. The switch, in turn, allows the caller to monitor the call in progress or a previous call that has been recorded. A database retains the caller's subject and queue status until an agent becomes available. When an agent becomes available the switch disconnects the monitor-only connection of the caller and forwards the call to the available agent.

In another embodiment of the invention, the caller is given an option to remain in the monitor-only status until the monitored call is completed and then to return to the top of the queue for the next available agent.

In yet another embodiment of the invention, the caller is given the option to enter a "chat room" where callers having similar problems can converse until an agent becomes available.

Figure 1:
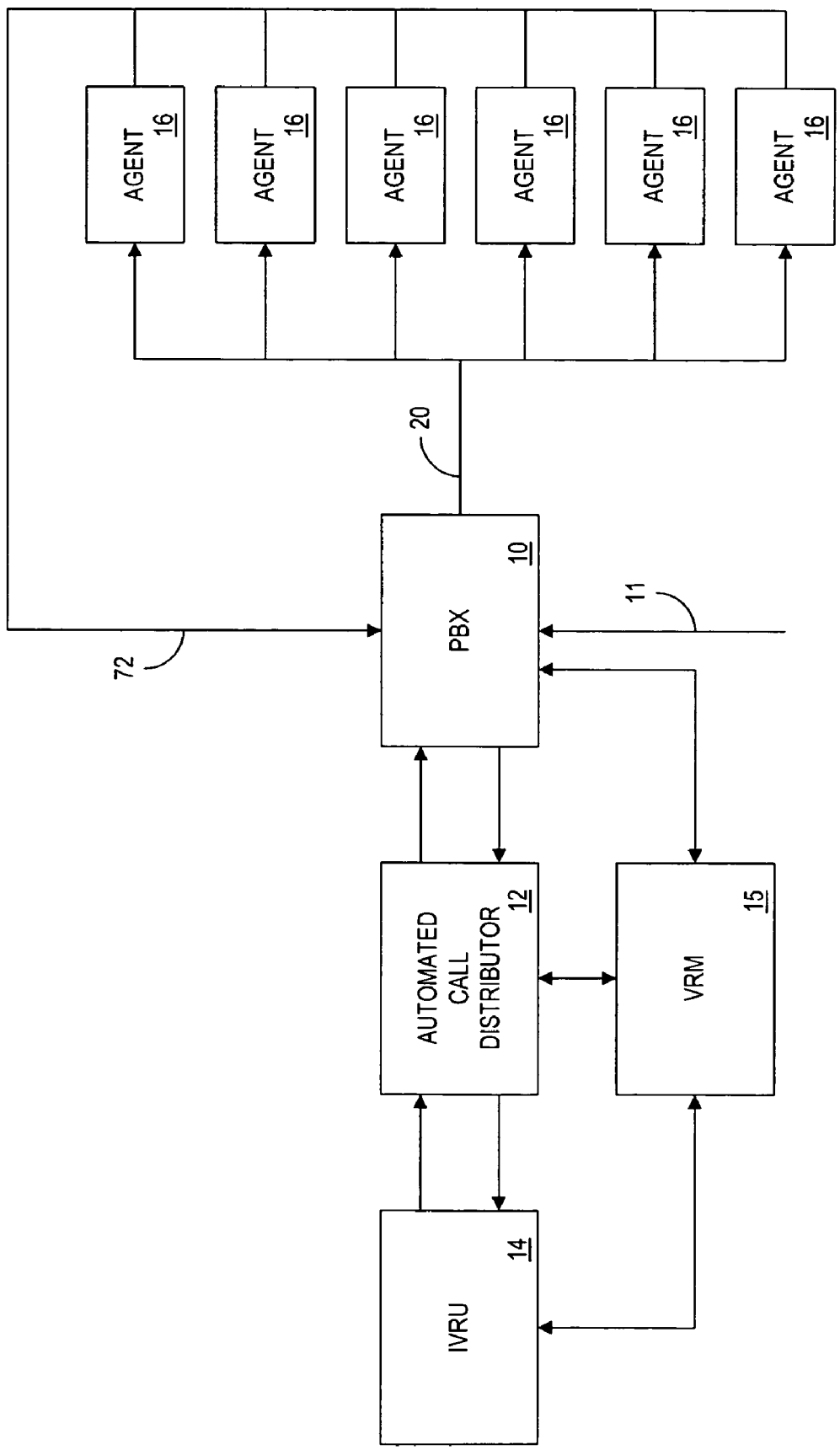
FIG. 1 is a block diagram of a caller-interactive phone queuing system consistent with some embodiments of the invention.

Referring to FIG. 1, a priority phone queuing system incorporating the invention includes a Private Branch Exchange (PBX) 10, an ACD 12 and an IVRU 14. PBX 10 receives incoming calls via trunk 11 and is, via trunk 20, connected to a plurality of agent terminals 16. PBX 10 further provides caller data to ACD 12 which handles queuing management of the calls and further controls the operation of IVRU 14. IVRU 14 communicates with the callers by passing/receiving audio signals through ACD 12 to/from PBX 10 and the connected calling party whose call has been placed on hold.

According to some embodiments, an optional Voice Recognition Module (VRM) 15 may be in communication with the PBX 10, the ACD 12, and/or the IVRU 14. VRM 15 may be operative, for example, to recognize one or more "keywords" spoken by one or more callers, and may be configured to store an indication of keywords (e.g., in a database). VRM 15 is discussed in further detail below with respect to FIG. 8.

Those skilled in the art will understand that the precise arrangement of PBX 10, ACD 12, IVRU 14 and VRM 15 shown in FIG. 1 is merely illustrative, and that other arrangements thereof can accomplish the invention to be described below.

In the description which follows, it will be assumed that all agent terminals 16 are busy and that PBX 10 cannot respond to an incoming call by making a direct connection to an agent. As a result, PBX 10 is forced to place an incoming call on hold and to provide data regarding the call to ACD 12. In response, ACD 12 places the incoming call in a queue, in the order received. Thereafter, when PBX 10 determines that an agent terminal is available, it so instructs ACD 12, which removes the call at the top of the queue and provides it to PBX 10, which then takes the corresponding incoming line off hold and connects the caller to the available agent terminal 16.

Once ACD 12 has placed the incoming call in a queue, it transmits a message to IVRU 14 which, in turn, plays a message for the caller whose call has been placed on hold. That message provides the caller with the option to "listen-in" on other customer service calls that are already in progress and that are directly related to the subject matter of the caller's query. Should the caller accept the offer, IVRU 14 notifies ACD 12 of the acceptance. ACD 12 then instructs PBX 10 to re-route the call to enable the caller to listen to an agent/caller discussing a subject that is common to the incoming caller's query.

According to some embodiments, ACD 12 may be programmed to receive information from the optional VRM 15 in order to determine the subject of the incoming caller's query.

ACD 12 can also be programmed to allow the caller whose call has been placed on hold to selectively "sample" available calls in progress or previously recorded customer service calls. The previously recorded calls are stored in data storage in PBX 10 in a "recorded call archive". Allowing the caller whose call is on hold to selectively browse through the archive or to listen to an on-going call may result in the caller's question being answered, without requiring connection to a live agent. The incoming caller, while on hold, is enabled to access and listen to any archived call in the same subject category as his call, and/or to listen to the different on-going calls to see if any one addresses the particular problem he has called about.

ACD 12 can further be programmed to allow the caller whose call has been placed on hold to participate in a "chat room" with other customers whose calls are also in the queue. A chat room is a line on which multiple people can talk simultaneously, enabling the customers to exchange advice regarding the problems they are experiencing. This exchange offers the possibility of obtaining a solution/answer to the caller's problem without requiring connection to a live agent. In some embodiments, a new caller entering a chat room may be identified to those already in the chat room.

Enabling an incoming caller whose call has been placed on hold in a queue to either "listen-in" on a live call-in-progress, to access and search through pre-recorded calls in the same subject area or to participate in a chat room, provides many benefits. Among these benefits are a reduction in calls that will require live operator assistance, an increase in customer satisfaction, and a decreased hold time for each caller.

Figure 2:
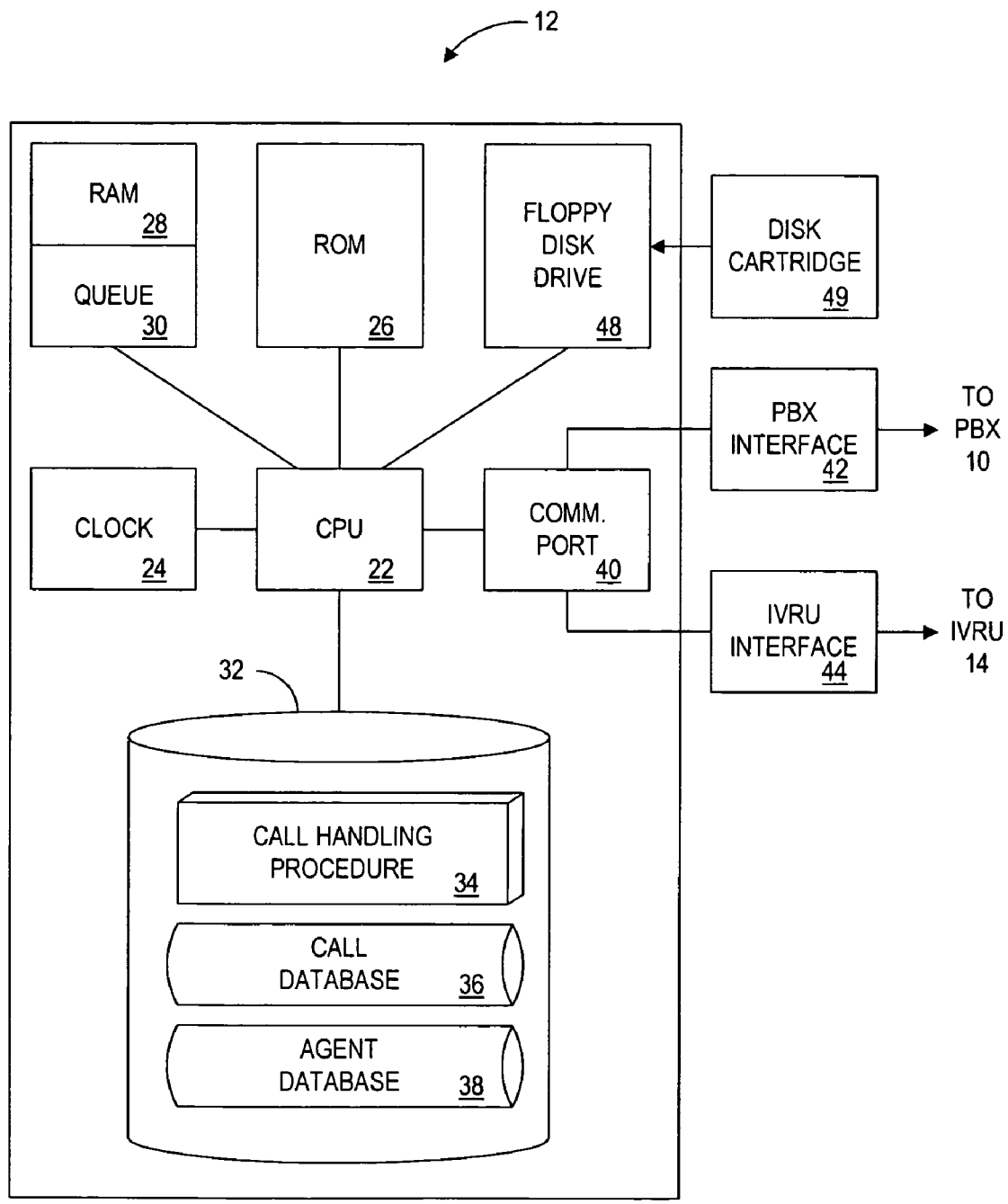
FIG. 2 is a block diagram of an automated call distributor (ACD) used with some embodiments of the invention.

Further details of the components of the system of FIG. 1 will now be described to enable a more complete understanding of the invention. Referring now to FIG. 2, ACD 12 is controlled by a central processing unit (CPU) 22 and includes a clock 24, a read-only memory (ROM) 26 and a random access memory (RAM) 28. RAM 28 includes one or more call queue(s) 30 of call identifier indicating calls awaiting connection to an agent terminal 16.

A data storage device 32 (e.g., a disk drive) includes a call handling procedure 34 that enables handling of queue(s) 30 and other functions performed by ACD 12, to be hereafter described. Data storage device 32 further includes a call database 36 and an agent database 38, all of which will be hereafter described in conjunction with the schematic illustrations in FIGS. 4 and 5.

ACD 12 communicates with PBX 10 via communications port 40 and PBX interface 42; and with IVRU 14, via IVRU interface 44. Also connected via communication port 40 is a floppy disk drive 48 which is adapted to receive a disk cartridge 49. It is to be understood that call handling procedure 34 can be off-loaded from disk cartridge 49 and thereafter utilized to control the operation of ACD 12.

Optionally, ACD 12 communicates with VRM 15 via communications port 40 and an appropriate interface.

Call database 36 maintains information regarding incoming calls. Agent database 38 provides further information regarding each agent terminal 16 and provides signals to PBX 10 which instruct as to the routing of control signals and telephone calls to individual agent terminals 16.

Figure 3:
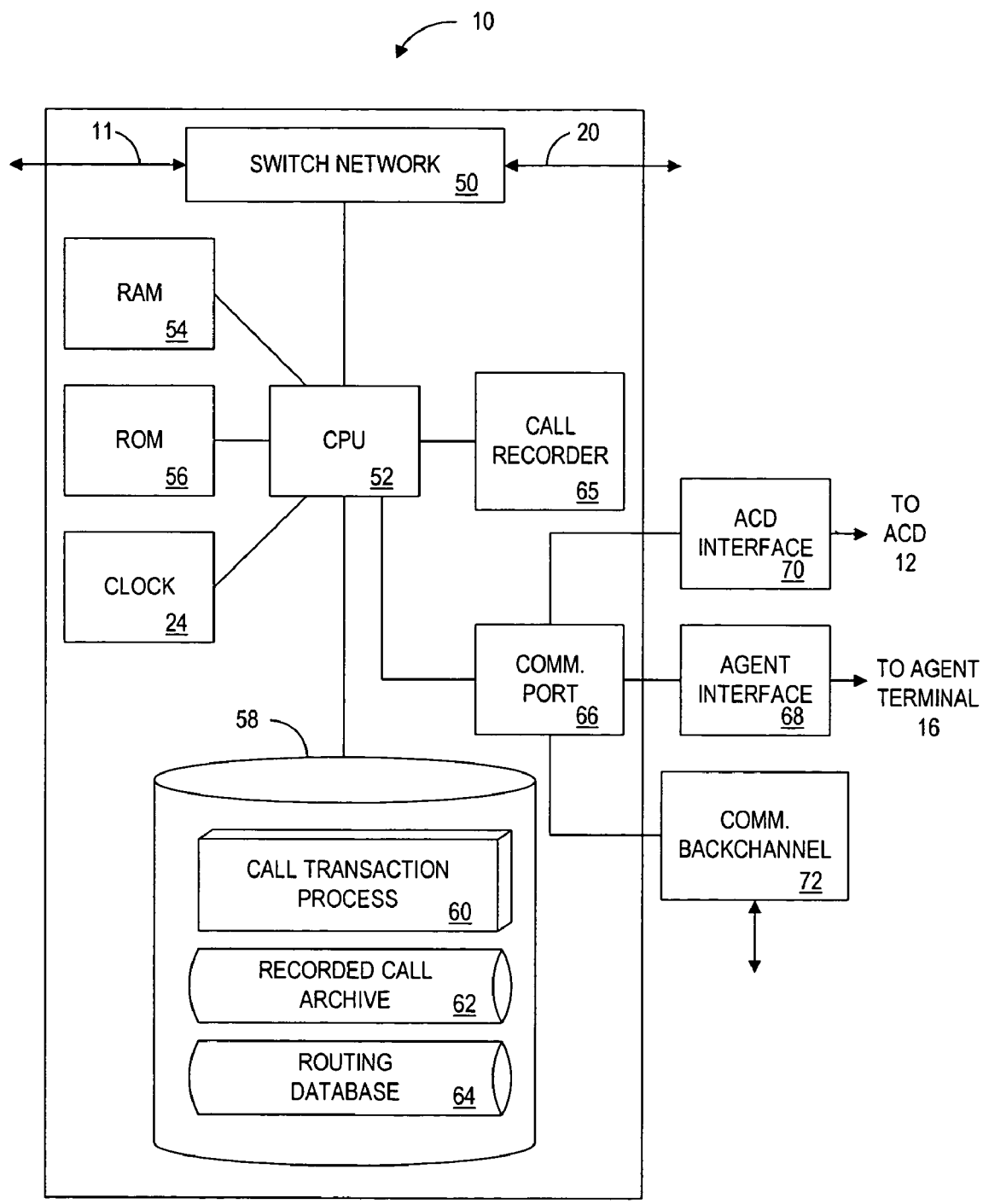
FIG. 3 is a block diagram of a private branch exchange (PBX) used with some embodiments of the invention.

Turning now to FIG. 3, PBX 10 comprises a switch network 50 which receives incoming calls via trunk 11 and provides outgoing connections to agent terminals 16 (FIG. 1) via trunk 20. Control of switch network 50 is exerted by central processing unit (CPU) 52 which is, in turn, controlled by procedures stored in RAM 54 and ROM 56.

Control procedures and databases used by CPU 52 are held in data storage device 58. Stored therein are a call transaction process 60, a recorded call archive database 62 and a routing database 64. Call transaction process 60 enables CPU 52 to react to an incoming call; to place the call on hold if all agents are busy; to connect the call to an available agent; and to communicate with ACD 12 so as to enable the caller to monitor calls in progress, to "browse" through recorded call archive 62 or to participate in a chat room. A call recorder 65 enables recording of calls and may be addressed by CPU 52, responsive to data in recorded call archive 62, to play previously recorded calls for caller listening.

Recorded call archive 62 holds recordings of prior calls with agents. These calls are classified by subject matter to enable an accessing thereof by an associative search process. Routing database 64 maintains route information to connected agent terminals 16 (and any other terminals that are connected to PBX 10).

PBX 10 controls communications with each of agent terminals 16, via a communication port 66 and an agent interface 68. Control signals are sent to agent terminals 16 via control wiring (not shown) between PBX 10 and each of agent terminals 16. The control signals may, alternatively, be carried over the internal telephone network comprising trunk 20. ACD interface 70 enables PBX 10 to communicate with ACD 12 (see FIG. 2).

Optionally, PBX 10 communicates with VRM 15 via communications port 66 and an appropriate interface.

Referring also to FIG. 1, each agent terminal 16 includes a communication "back" channel connection 72, which enables an agent at an agent terminal 16 to provide a call subject classification back to PBX 10. More specifically, when an agent has initially conversed with a caller and determined the subject of the caller's query, the agent transmits a subject category value to PBX 10, via back channel 72. PBX 10 feeds the call subject category value to ACD 12 for storage in a call database in association with the call.

It is to be understood that PBX 10, ACD 12, IVRU 14 and VRM 15 may all be commercially available units. For instance, the Ameritech Corporation's Call Center provides all of the functions including automatic call agent functions, automatic call distribution/switching functions and interactive voice response functions.

Turning now to FIGS. 4-6, three databases are schematically illustrated which aid in the implementation of the invention. Call database 36 (FIG. 4) includes a listing of call tracking numbers which are assigned to calls as each call is received; a call subject category which identifies a subject classification of a caller's inquiry; a call position value which indicates the call's queue position; the caller's phone number; a channel number which identifies the internal telephone line to which the call has been assigned (for connection to an agent); the time the call was received; an agent tracking number; monitored agents (if any); and an archive call number which indicates an archived call (if any) to which the caller has been connected.

FIG. 5 illustrates the contents of agent database 38. The agent identification number is self-explanatory. The agent status indicates whether the agent is busy or available. The agent area of expertise entry defines a particular subject matter (or subject matters) that the agent is competent to handle. The latter category enables ACD 12 to connect an incoming call (where the subject of the call has been pre-identified by the caller), to an agent having expertise in the call's subject matter.

FIG. 6 illustrates recorded call archive database 62 which includes four fields, i.e., a call subject category which defines the subject matter of a call recorded in the archive database; the date the call was recorded; the length of the recorded call; and the recorded call data. Each field enables ACD 12, in conjunction with call handling procedure 34, to manage the connection of an archived call to a caller waiting in a queue. The subject matter and date of the recorded call are used to access the recording within archive database 62.

It is to be understood that the above-described databases are intended to illustrate one embodiment of the present invention. Many alternative database structures will be apparent to those skilled in the art.

Figure 7:
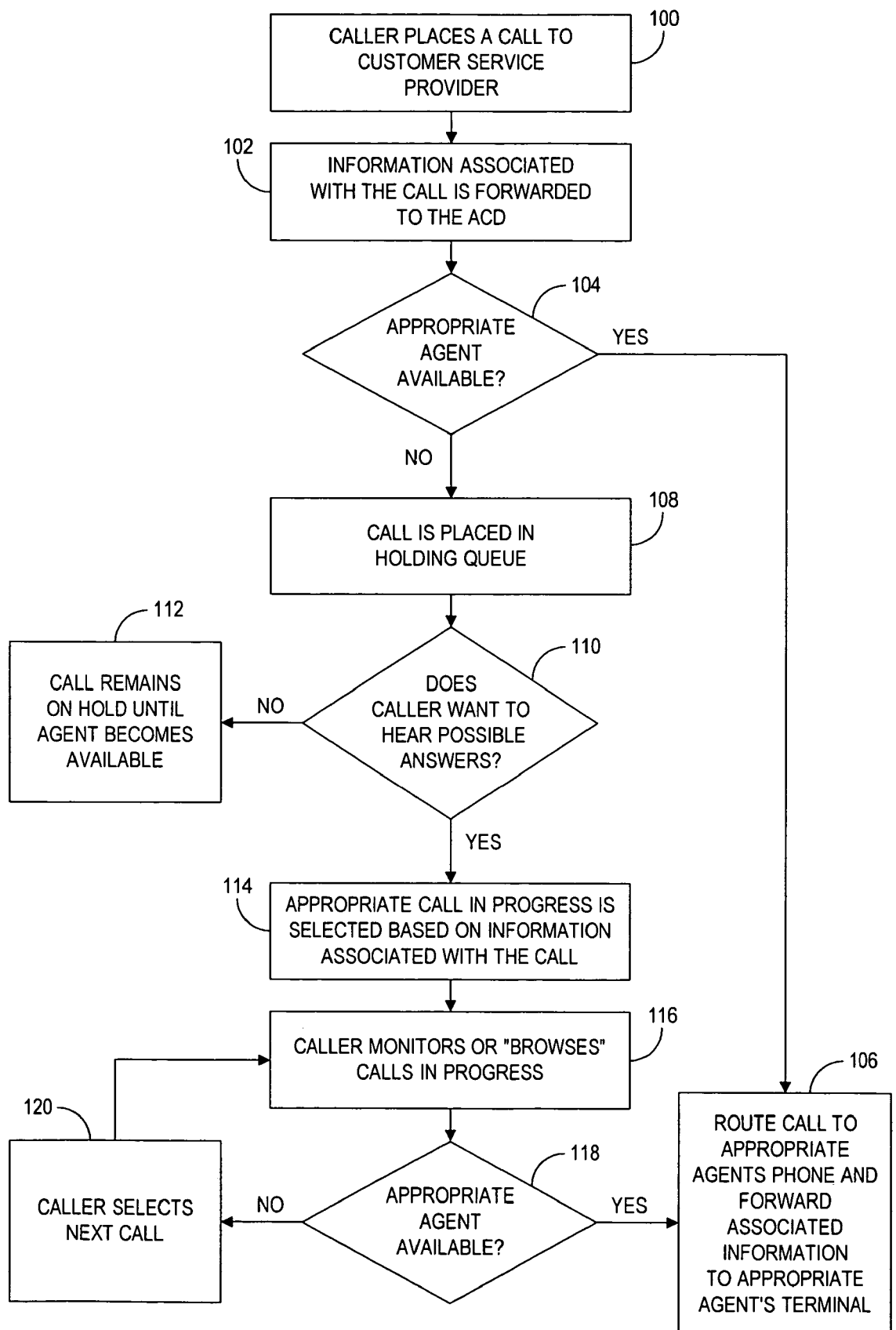
FIG. 7 is a flow chart describing the method by which calls are processed and routed in accordance with some embodiments of the invention.

Referring to the flow diagram of FIG. 7, the procedure employed by the invention will be described. Initially, a caller places a call to a customer service provider (box 100). The incoming caller's telephone number is detected by an automatic number identification (ANI) facility. In response to voice prompts from IVRU 14, and in conjunction with control commands from ACD 12, PBX 10 then inputs information regarding the call to ACD 12 (box 102). One such piece of information may be the subject matter of the call. For instance, IVRU 14 may provide a series of subjects to the caller, and ask the caller to respond by depressing a specified key to identify a particular subject (e.g. "press 1 for printer problems, press 2 for modem problems").

Once the call information has been entered by ACD 12 into call database 36, the system determines whether an appropriate agent is available (decision box 104). If so, the call is routed to the agent's phone and the information associated with the call is transmitted to the agent's terminal (box 106). If no agent is available, the call is placed in the holding queue (box 108). IVRU 14 plays a message asking whether the caller would like to monitor an on-going call, an archived call or participate in a "chat room" (decision box 110). If the caller declines to hear more information, the call remains on hold in the holding queue (box 112) to await availability of an appropriate agent (decision box 118).

If the caller agrees to hear additional information (decision box 110), an appropriate call in-progress, archived call or chat room is selected, as the case may be, based on the subject of the incoming call and the preferences of the caller (box 114). For instance, each call in progress with an agent has already had a subject matter categorization entered into call database 36. Accordingly, by matching the incoming call subject with ongoing call subject categories in call database 36, an appropriate call in progress can be selected for connection to the incoming caller's line. It is to be noted, however, that the connection of the incoming caller's line only allows a monitoring of the call in progress call. It should be noted that the initial caller who is currently talking to a live operator is provided the option of maintaining a private call. Should the caller not want another party to listen in, he can simply designate so at the onset of the connection with the live operator. Call centers may provide callers with some incentive to allow other callers to listen in. For example, a caller might receive a discount towards a future purchase for allowing an open line.

In some embodiments, operators may be given the ability to mute or lock out any listeners. When caller sensitive material or information is going to provide a credit card account number or software license number, the operator might simply press a button, securing the phone line such that no one can hear that sensitive information.

In at least one embodiment, the feed to a caller who is listening to an ongoing call may be delayed (e.g., seven seconds). This delay between when the ongoing conversation takes place and when the caller listening in would hear it would enable an agent (human or automated) monitoring the conversation to mute or otherwise interrupt the feed to the listening caller. In this way, the agent may prevent the transmission of sensitive information to any caller(s) listening in. In some embodiments, the VRM 15 may be configured to identify sensitive information, such as a credit card account number, telephone number or address information, by recognizing, for example, that the ongoing caller has recited a certain number of numeric digits in a row. The muting or transmission interruption may be performed by the agent involved in the ongoing call, an automated "muting agent," a human "muting agent" or any combination thereof. In some embodiments, an agent may receive an indication from a VRM that potentially sensitive information has been provided in the ongoing conversation. Of course, although various techniques for dealing with sensitive information have been discussed above with respect to ongoing conversations, it will be readily apparent that such techniques may be used with archived conversations, chat rooms and other sources of information as well.

Similar actions occur with respect to archived calls and chat room(s), depending on the incoming caller's choice. For instance, if the caller elects to listen to an archived call, call handling procedure 34 selects an appropriate recorded call from the archive and plays the call for the incoming caller.

Should the caller determine that a call selection made by call handling procedure 34 is not of interest, or involves a subject that does not match the caller's subject, the caller is enabled (box 116) to monitor or "browse" other calls in progress or other archived calls. This browsing is enabled through the entry (by the caller) and detection (by IVRU 14) of appropriate tones to restart the call selection process described above. Only when an appropriate agent becomes available (box 118) does the procedure terminate, to enable the incoming call to be routed to the agent (box 106).

If an appropriate agent is still not available when a monitored call ends, and further calls are available to be monitored, the system then enables the caller to select another call (box 120). This action continues until an agent becomes available or the caller determines that his/her query has been answered by the aforesaid call listening/chat room actions.

As discussed herein, in some embodiments information regarding the subject of an incoming call (e.g., as indicated in call database 36) may be used in order to determine an appropriate call in-progress, archived call or chat room. The caller may be asked by the IVRU 14, for instance, to indicate the subject of his call by depressing a specified key to identify a particular subject. Then, by matching the incoming call subject with the subject of ongoing calls, archived calls and/or chat rooms, an appropriate source of information can be selected for connection to the incoming caller's line.

In some embodiments, one or more keywords may be used to provide some more specific information about the subject of a call. For example, a subject category may encompass a wide variety of issues. Thus, even if an incoming caller has indicted an interest in "modems" and several ongoing calls are related to "modems," it may be unlikely that the incoming caller will have his issue addressed, given the wide variety of issues relating generally to "modems." The caller may have to listen in on several conversations before finding one that deals with his particular problem (e.g., "modem dropping calls"). Some embodiments of the present invention provide for various ways of identifying more detailed information (e.g., using keywords, sub-categories, conversation summaries) within a general subject category. For example, by associating one or more keywords with a call (e.g., as identified by VRM 15), more specific searches may be made for relevant conversations.

According to some embodiments, determining the subject of an incoming call and/or determining the subject of ongoing calls, archived calls and/or chat rooms, may involve use of VRM 15.

Figure 8:
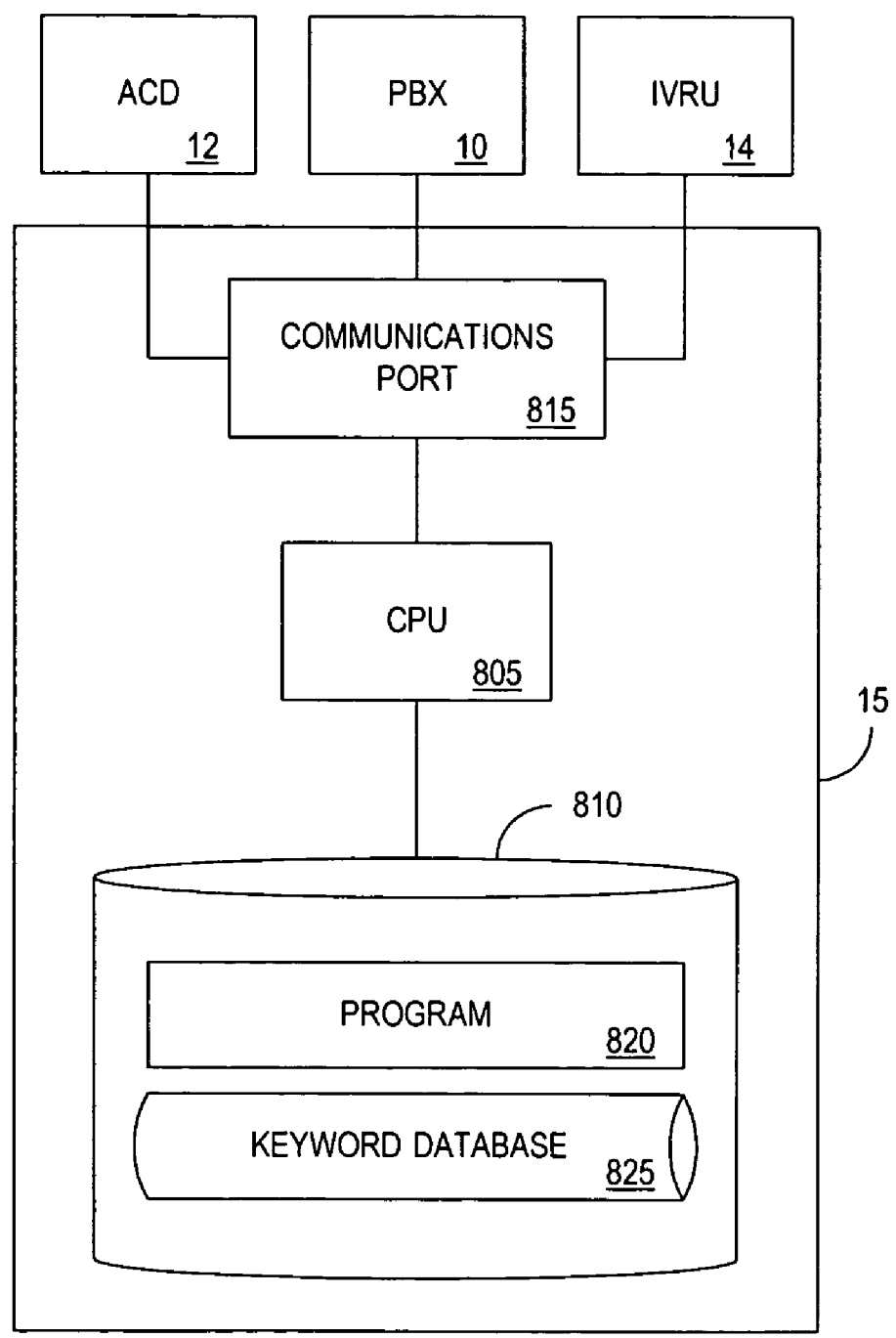
FIG. 8 is a diagram illustrating an example voice recognition module (VRM) according to some embodiments of the present invention.

FIG. 8 depicts one example of VRM 15 that may be practicable for use with one or more embodiments of the present invention. VRM 15 may be implemented as a system controller, a dedicated hardware circuit, an appropriately programmed general purpose computer, or any other equivalent electronic, mechanical or electromechanical device suited for various types of voice recognition functions.

VRM 15 comprises a processor 805, such as one or more Intel® Pentium® processors. The processor 805 is coupled to a communication port 815 through which the processor 805 communicates with one or more other devices (optionally via one or more appropriate interfaces). Communication port 815 preferably is in communication with one or more of ACD 12, PBX 10 and IVRU 14.

The processor 805 is also in communication with a data storage device 810. The data storage device 810 comprises an appropriate combination of magnetic, optical and/or semiconductor memory, and may include, for example, Random Access Memory (RAM), Read-Only Memory (ROM), a compact disc and/or a hard disk. The processor 805 and the storage device 810 may each be, for example: (i) located entirely within a single computer or other computing device; or (ii) connected to each other by a remote communication medium, such as a serial port cable, telephone line or radio frequency transceiver. In one embodiment, the VRM 15 may comprise one or more computers that are connected to a remote server computer for maintaining databases.

The data storage device 810 stores a program 820 for controlling the processor 805. The processor 805 performs instructions of the program 820, and thereby operates in accordance with the present invention, and particularly in accordance with the methods described in detail herein. The program 820 may be stored in a compressed, uncompiled and/or encrypted format. The program 820 furthermore includes program elements that may be necessary, such as an operating system, a database management system and "device drivers" for allowing the processor 805 to interface with computer peripheral devices. Appropriate program elements are known to those skilled in the art, and need not be described in detail herein.

According to an embodiment of the present invention, the instructions of the program 820 may be read into a main memory from another computer-readable medium, such as from a ROM to a RAM. Execution of sequences of the instructions in program 820 causes processor 805 to perform the process steps described herein. For example, various computer-based algorithms for recognizing human speech, generally termed Automatic Speech Recognition (ASR), are well known. In another example, voice applications such as Nuance Call Steering™ may use VoiceXML and software for recognizing free-style speech to interact with callers and automatically route calls. In another example, iVoice™ by iMessaging Systems provides software capable of recognizing certain keywords for use in responding to callers. In alternative embodiments, hard-wired circuitry may be used in place of, or in combination with, software instructions for implementation of the processes of the present invention. Thus, embodiments of the present invention are not limited to any specific combination of hardware and software. Various types of VRMs applicable for use with various embodiments of the present invention will be readily apparent to those skilled in the art in light of the present disclosure.

The storage device 810 also stores a keyword database 825. The keyword database is described in detail below and depicted with exemplary entries in FIG. 9.

As will be understood by those skilled in the art, the schematic illustrations and accompanying descriptions of the databases presented herein are exemplary arrangements for stored representations of information. A number of other arrangements may be employed besides those suggested by the tables shown. Similarly, the illustrated entries of the databases represent exemplary information only; those skilled in the art will understand that the number and content of the entries can be different from those illustrated herein. Further, despite the depiction of the databases as tables, an object-based model could be used to store and manipulate the data types of the present invention and likewise, object methods or behaviors can be used to implement the processes of the present invention.

Note that, although the keyword database is described as being stored in VRM 15, in other embodiments of the present invention some or all of these databases may be partially or wholly stored in another device, such as one or more of ACD 12, PBX 10, IVRU 14 or any combination thereof.

FIG. 9 is a tabular representation 900 of the keyword database 825. The tabular representation of the keyword database includes a number of example records or entries, each defining a call and one or more keywords associated with the subject matter of the call. Those skilled in the art will understand that the keyword database 825 may include any number of entries.

The tabular representation 900 of the keyword database 825 also defines fields for each of the entries or records. The fields specify: (i) a call tracking number 905 that uniquely identifies the corresponding call, (ii) a call type 910 that indicates the type of call (e.g., ongoing, incoming or archived), (iii) a subject category 915 that indicates at least one subject category associated with the call, and (iv) keywords detected 920 that indicates one or more keywords detected during the corresponding call (e.g., keywords associated with the subject category 915).

The exemplary system discussed above, including the hardware components, software components, and the databases, are useful to perform various methods of the invention described herein. However, it should be understood that not all of the above-described components and databases are necessary to perform any of the methods of the present invention. In fact, in some embodiments, none of the above-described system is required to practice the methods of the present invention. The system described above is merely an example of a system that would be useful in practicing some methods of the invention.

Figure 10:
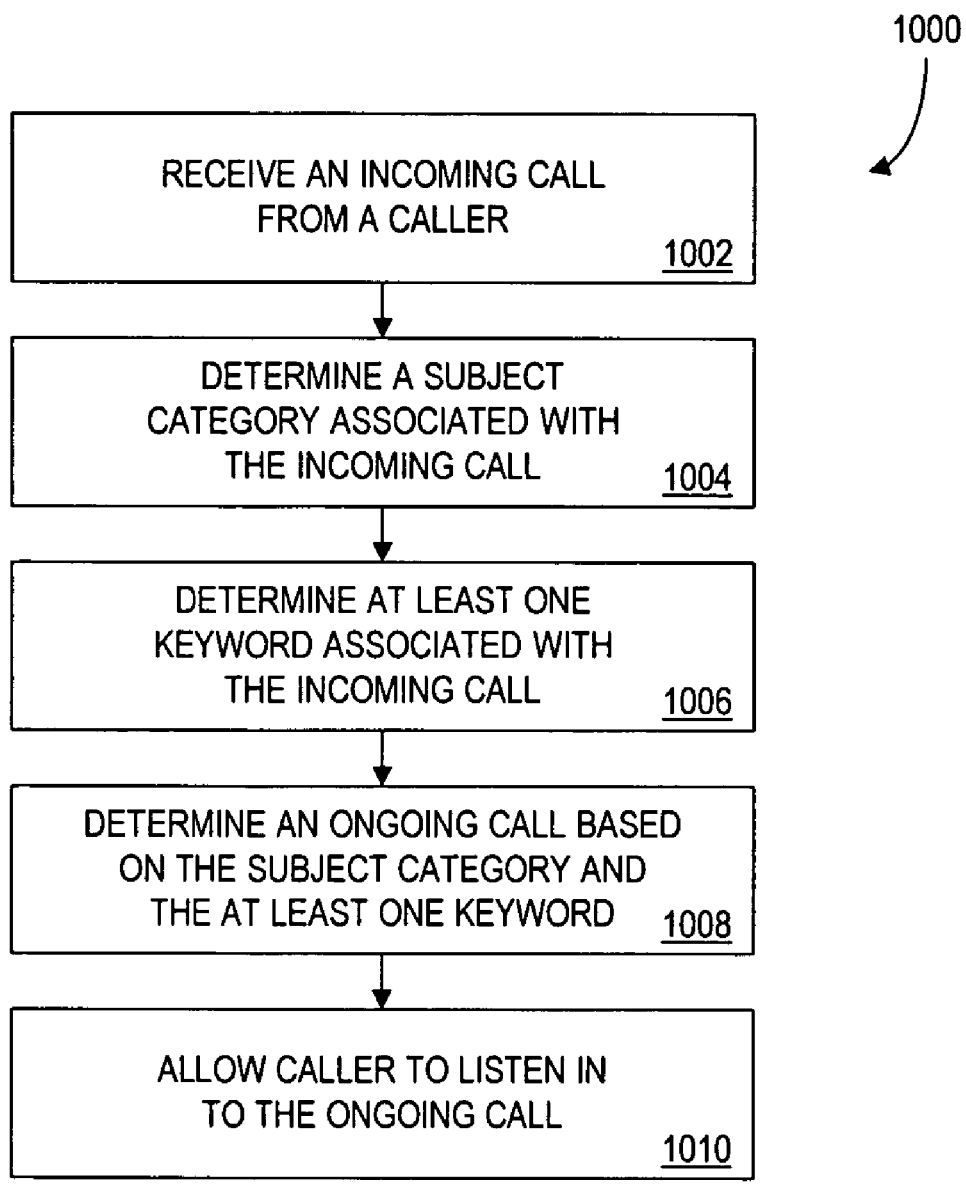
FIG. 10 is a flow chart illustrating an example process according to some embodiments of the present invention.

Referring to FIG. 10, a flow chart 1000 is depicted that represents some embodiments of the present invention. Although the method 1000 is discussed as being performed by a call system, it will be understood in light of the present disclosure that the method may be performed by a PBX 10, an ACD 12, an IVRU 14, a VRM 15 and/or one or more agents. Similarly, although some aspects of the method 1000 are discussed as being performed in relation to an ongoing call, it will be understood in light of the present disclosure that the method may involve archived calls and/or chat room conversations. It must be understood that the particular arrangement of elements in the flow chart 1000 of FIG. 10, as well as the number and order of example steps of other various methods discussed herein, is not meant to imply a fixed order, sequence, quantity, and/or timing to the steps. Embodiments of the present invention can be practiced in any order, sequence, and/or timing that is practicable. Likewise, the labels used to reference the individual steps of the methods are not meant to imply a fixed order, sequence, quantity, and/or timing to the steps.

In general terms and still referring to FIG. 10, method steps of some embodiments of the present invention may be summarized as follows. In step 1002, the system receives an incoming call. In step 1004, a subject category associated with the incoming call is determined. In step 1006, at least one keyword associated with the incoming call is determined. In step 1008, an ongoing call is determined based on the subject category and keyword(s). In step 1010, the caller associated with the incoming call is allowed to listen to the ongoing call. As indicated above, in some embodiments these steps may be performed in a different order, and more, fewer, and/or alternative steps may be used as well.

Each of these exemplary steps is discussed in greater detail herein. Note that not all of these steps are required to perform the methods of the present invention and that additional and/or alternative steps are also discussed below. Also note that the above general steps represent features of only some of the embodiments of the present invention. Such steps may be combined and/or subdivided in any number of different ways so that methods of the present invention include more or fewer actual steps. For example, in some embodiments additional steps may be added to update and maintain the databases described above. As indicated, however, it is not necessary to use the above-described databases in all embodiments of the invention. In some embodiments, a described step may be performed by or with respect to any number of devices or entities. For example, a step may be subdivided into sub-steps, some of which are performed by one device, and some of which are performed by or otherwise involve a different device. In other words, the methods of the present invention may contain any number of steps performed by any number of entities that are practicable to implement the various different inventive processes described herein.

Determining or identifying an ongoing call based on the subject category and keyword(s) of an incoming call may include looking up information about ongoing calls. For example, a subject category and/or keyword(s) may be determined for each ongoing call. In some embodiments, the VRM 15 may use information stored in the keyword database 825 for determining whether any keywords for a particular subject matter have been used, for example, in an incoming, ongoing or archived call or chat room conversation. In at least one embodiment, the VRM 15 analyzes a call to determine if any keywords are used in the call. The VRM 15 may identify particular keywords that are associated with the indicated subject category of the call (e.g., in a database accessible by VRM 15). The particular keywords associated with a particular subject category may be determined by the call center, for example, and may be modified over time in order to optimize call routing.

In at least one embodiment, call routing may be fully automated (e.g., without intervention by a human agent). For example, the ACD 12 receives a call from a first caller. The ACD 12 then actuates the IVRU 14 to greet the caller. The caller is provided with a pre-recorded menu of categories. The caller indicates he has a "printer" problem by selecting the corresponding option from the menu. The ACD 12 then accesses an agent database to determine if there are any available agents trained to handle a call in the category of "printers." For example, the exemplary agent database 38 (FIG. 5) might indicate that a particular agent is both (i) trained to handle calls about "printers" (as indicated, for instance, in the agent area of expertise field) and (ii) currently available (as indicated, for instance, in the agent status field). Accordingly, the call from the first caller may then be routed via PBX 10 to an agent terminal associated with an agent who is available and knowledgeable in the area of "printers."

As discussed herein, the PBX 10 may be connected to the VRM 15, which may be operative to recognize "keywords" spoken by one or more callers and to record indications of such keywords (e.g., in keyword database 825). In this example, the first caller has previously indicated a particular call category ("printers"). The VRM 15 may then monitor the conversation between the agent and the first caller for utterances of the keywords. A record of the keyword database 825 corresponding to the first caller's ongoing call may be updated when the caller and/or the agent utter a recognized keyword. For example, a VRM 15 may be operable to recognize the utterance of a particular word, such as "ink," and communicate with a keyword database such that data associated with the first call (i.e., an ongoing call) is continually updated. Updating may occur substantially in real time, may be periodic, according to a schedule, or at any time as deemed practicable for the particular application. As depicted in FIG. 9, the keyword database 825 may eventually indicate various keywords (e.g., "ink," "photo") stored in association with the ongoing call.

Continuing with the example, a call from a second caller (i.e., an incoming call) may then be received by the ACD 12. The second caller may also indicate, via the IVRU 14 as described, a "printers" problem. The ACD 12 may then access an agent database as described, and determine that there are no available "printers" agents for the second caller.

In one embodiment, to describe his problem further, the second caller may identify various keywords using a menu of the IVRU 14 as described. For example, after indicating that he has a "printer" problem, the caller may be prompted: "Press '1' if you have a problem with ink, press '2' if you have a paper jam, press '3' if your printer has no power," etc.

In another embodiment, the second caller may provide a brief verbal description of his problem. The VRM 15 may identify one or more keywords from this description. For example, an IVRU 14 prompt may indicate: "At the tone, please tell us a little more about your problem. Please keep your description brief. When you are done, press the pound key." The VRM 15 may monitor the second caller's description and identify various keywords.

Any keywords identified in association with the (second caller's) incoming call may be stored in the keyword database 825. A program of the VRM 15, for example, may then access the keyword database 825 to try and locate an ongoing call having the same subject category and one or more of the same keywords. If a call (e.g., ongoing, archived) is identified that is relevant to the subject of the incoming call, the incoming caller may be provided with the opportunity to listen to the identified call while on hold.

For instance, as depicted in FIG. 9, the subject and keywords of the incoming call "1234599" match those of the ongoing call "1234555." Thus, in the present example, the second caller is provided with an opportunity to listen to the first call. For example, an IVRU 14 may prompt the second caller: "Your estimated hold time is eight minutes. In the meantime, we've found an ongoing call that might provide an answer to your question. Would you like to listen to this call while waiting for an agent? Press '1' if yes, press '2' to hear music instead." If the second caller indicates he would like to listen to the first call, the ACD 12 may then provide a listen-only feed as described previously herein.

In at least some embodiments, the determining of subject categories and/or keywords associated with a call may be performed by one or more "routing agents." In one example, a routing agent may be provided with a list of ongoing calls, their subject categories and any keywords identified in each conversation. For instance, information such as that depicted in FIG. 9 for the ongoing calls may be provided to a routing agent. As described above, such information may be updated from time to time to reflect new utterances of keywords. Such a list may be presented to a routing agent, for example, as a printout or as a screen of a software application program running on a terminal of the agent (e.g., the terminal may be connected to the PBX/ACD/VRM via a communications port).

Continuing with the example, the routing agent receives an incoming call. In one embodiment, the caller has previously identified a subject category via the IVRU 14. In another embodiment, the routing agent determines a subject category while speaking with the caller. The routing agent may then ask the caller to describe his problem. Based on the caller's description and the list of ongoing calls, the routing agent may determine to route the caller to listen to a particular ongoing call.

In still another embodiment, the list of ongoing calls provided to the routing agent does not detail keywords associated with each call, but rather summarizes the context or otherwise indicates the topic of each ongoing conversation. In this manner, for example, a routing agent might be provided with data that is more explanatory (and thus more useful to the agent) than keywords alone: "Ongoing Call #1234578: Caller is unable to establish a connection between digital camera and computer." U.S. Pat. No. 5,937,422 granted to Nelson, et al. teaches a method of automatically assigning a label or topic description to a computer-processed conversation that may be useful in some embodiments of the present invention.

Of course, labels and categorizations may be applied to conversations that are recorded and stored for later playback to on-hold callers. In one embodiment, on-hold callers may (i) indicate a subject category, (ii) browse a list of labels or descriptions of archived conversations, and (iii) select a conversation to hear. It may be appreciated that, in addition to keywords and labels, other types of categorizations may be applied to call data. For example, "sub-categories" may be associated with conversation data. For instance, if a subject category is "printers," an associated sub-category may be "printer jams."

In some alternative embodiments, no VRM may be necessary for identifying keywords. Instead, the system may be operable to allow agents engaged in ongoing calls to identify keywords while talking to callers. For example, an agent engaged in an ongoing call may, while listening to a caller describe a problem related to a printer, click a button or checkbox on a software application to indicate a keyword (e.g., "INK") that the caller has mentioned. A record corresponding to the call (e.g., in the keyword database 825) may be updated with the recognized keyword(s). For example, an application software program of an agent's terminal may be in communication with the PBX 10 and/or ACD 12. A caller may have previously indicated a category via an IVRU 14. As the agent receives the call, the program may then display a number of clickable buttons representing keywords commonly associated with the indicated call category. As she hears each keyword, the agent clicks the corresponding button. Such data may then be transmitted to the keyword database 825. Thus, no VRM is necessary to identify keywords. After the caller has provided sufficient information, the agent may then route the caller to an available agent or invite the caller to listen to an ongoing or archived conversation based on the indicated keywords.

Additional Embodiments

Some embodiments of the present invention allow for a caller who is on hold to indicate that his problem or question has been solved. It may be expected that a caller will hang up when he has received information that he believes will solve his problem (e.g., by listening to a related ongoing call). Of course, some callers who are on hold may simply hang up, for example, because they feel they have been on hold for too long. Some operators of call systems may find it appealing to receive an indication that a caller wished to terminate his call because his issue was resolved (or for some other reason).

In at least one embodiment, a caller is provided with the opportunity to indicate that his question was answered before terminating the call (e.g., by hanging up the phone). In one example, before a switching a caller to a listen-only channel, the system may output a message (e.g., via IVRU 14): "If your question is answered while listening to the conversation, please press '1' before hanging up so that another caller can take your place. If the conversation is not helpfull, please press '0' at any time so we can find another conversation for you." In this way, if a caller's question is answered, he can indicate this to the call system. Such information may be relied upon to allow a call center to evaluate and improve its system over time. For example, a call center may be able to determine a success/fail rate for the listen-in sessions that it provides to its callers.

According to some embodiments, a caller with an incoming call may be offered the option of listening in only (i.e., the system will not connect her to a live agent). In at least one embodiment, the caller may be required to confirm or agree that she wants to listen only. For example, the caller may be requested to press a button specified by the IVRU 14 to indicate that the customer does (or does not) want only to listen.

Enabling callers to listen in to various ongoing and recorded conversations may allow a business, for example, to gain information about the types and frequency of problems encountered by users of a competitor's products. For example, someone might indicate that he has a problem with a competitor's printer and might then be allowed to listen to numerous ongoing and recorded calls dealing with issues related to that printer. According to some alternative embodiments, prior to being allowed to listen to any content provided by the call system, a caller with an incoming call might receive a prompt to confirm her understanding of terms of use of the option to listen in. For example, without limitation, the prompt may instruct the caller to confirm one or more of the following: that she is or represents a purchaser or end-user of a product she has indicated; that she truly does have an issue she would like to resolve; that any information provided to the caller (e.g., whether live, archived, or by allowing the caller to listen in) is provided solely for the purpose of resolving an issue; that the information may not be used for any commercial, marketing or research purposes; and the like. In some embodiments, a caller may be required to enter a serial number, product identifier, other information that may be used to verify that the caller is a purchaser or owner of a product.

The provision of the above-noted listening/chat room features enables a caller whose call has been placed in a queue to possibly find an answer to a query in advance of being connected to an agent. As a result, a number of incoming calls will disconnect before being connected to an agent, thereby enabling an improvement in service to other callers still on hold. Further, since the call queue moves faster, the call center stands to gain as a result of shorter call times leading to lower telecommunication costs.

A system embodying the invention can include further features, which will enable the system to exhibit additional options for call center operations. For example, a caller might be given the option of not making his call available for monitoring by other callers; the caller might be billed less for a call that is made available for monitoring; if a live call is chosen to be monitored, the listening-in caller might lose his position in the call queue, to be positioned at the end of the queue when he quits the call monitoring function. Further, a charge may be levied for the monitoring/listening-in option.

Various embodiments of the present invention provide a call queuing system that enables a caller to obtain information in response to a query, prior to an agent being able to answer the call.

At least one embodiment of the present invention provides a call queuing system which enables a caller whose call has been placed in a queue to "listen in" on other calls wherein discussions are being held that relate to the caller's query.

Some embodiments of the present invention provide a call queuing system which allows a caller, whose call is on hold, to browse through an archive of recorded calls or to listen to an on-going call so as to enable the caller's question to be possibly answered, without requiring connection to a live agent.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A method comprising:
   receiving a telephone call from a first caller;
   determining a category of the telephone call;
   determining at least one keyword associated with the telephone call;
   determining a conversation involving a second caller; and
   enabling the first caller to participate in the conversation involving the second caller,
   in which the conversation comprises an in-progress call between the second caller and an agent associated with a call center, and
   in which the first caller is not an agent associated with the call center.

2. The method of claim 1, in which the first caller participates in the conversation by listening to the conversation.

3. The method of claim 1, in which the conversation comprises a conversation between the second caller and at least one caller.

4. The method of claim 1, in which the conversation comprises a conversation between the first caller and the second caller.

5. The method of claim 1, further comprising:
   arranging for the second caller to receive a benefit.

6. The method of claim 1, in which the telephone call from the first caller is in a queue.

7. The method of claim 1, in which determining the conversation comprises:
   determining the conversation based on the category.

8. The method of claim 1, in which determining the conversation comprises:
   determining the conversation based on the at least one keyword.

9. The method of claim 1, in which determining the conversation comprises:
   determining the conversation based on the category and the at least one keyword.

10. The method of claim 1, in which determining the at least one keyword comprises:
    determining the at least one keyword based on the category.

11. The method of claim 1, in which determining the at least one keyword comprises:
    determining the at least one keyword using a voice recognition module.

12. The method of claim 1, in which determining the at least one keyword comprises:
    determining the at least one keyword using automatic speech recognition.

13. The method of claim 1, in which determining the at least one keyword comprises:
    receiving an indication of the at least one keyword via an interactive voice response unit.

14. The method of claim 1, in which the at least one keyword is determined by an agent.

15. The method of claim 1, further comprising:
    storing an indication of at least one keyword associated with the conversation.

16. The method of claim 15, in which determining the conversation comprises:
    determining the conversation based on the at least one keyword associated with the telephone call and the at least one keyword associated with the conversation.

17. The method of claim 1, further comprising:
    muting a portion of the conversation while the first caller is participating in the conversation.

18. The method of claim 1, further comprising:
    offering the first caller an option to participate in the conversation involving the second caller.

19. The method of claim 1, further comprising:
    before enabling the first caller to participate in the conversation,
    transmitting a request to the first caller to provide a product identifier.

20. The method of claim 1, further comprising:
    before enabling the first caller to participate in the conversation,
    transmitting a request to the first caller to accept at least one term of use of the conversation.

21. The method of claim 1, further comprising:
    arranging for the first caller to provide a benefit in exchange for participating in the conversation involving the second caller.

22. The method of claim 21, in which arranging for the first caller to provide the benefit comprises:
    arranging for the first caller to provide the benefit before the first caller participates in the conversation.

23. The method of claim 21, in which arranging for the first caller to provide the benefit comprises:
    arranging for the first caller to provide a payment.

24. A computer-readable medium storing instructions configured to direct a processor to perform the method of claim 1.

25. A device for processing a telephone call, comprising:
    a processor; and
    the computer-readable medium of claim 24, in communication with the processor.

26. A method comprising:
    receiving a telephone call from a first caller;
    determining a category of the telephone call;
    determining at least one keyword associated with the telephone call;
    determining a conversation involving a second caller; and
    enabling the first caller to participate in the conversation involving the second caller,
    in which the conversation comprises a recorded call between the second caller and an agent associated with a call center, and
    in which the first caller is not an agent associated with the call center.

27. The method of claim 26, in which the first caller participates in the conversation by listening to the conversation.

28. The method of claim 26, in which the conversation comprises a conversation between the second caller and at least one caller.

29. The method of claim 26, in which the conversation comprises a conversation between the first caller and the second caller.

30. The method of claim 26, in which the second caller placed a second telephone call to a call center.

31. The method of claim 26, further comprising:
    arranging for the second caller to receive a benefit.

32. The method of claim 26, in which the telephone call from the first caller is in a queue.

33. The method of claim 26, in which determining the conversation comprises:
    determining the conversation based on the category.

34. The method of claim 26, in which determining the conversation comprises:
    determining the conversation based on the at least one keyword.

35. The method of claim 26, in which determining the conversation comprises:
    determining the conversation based on the category and the at least one keyword.

36. The method of claim 26, in which determining the at least one keyword comprises:
    determining the at least one keyword based on the category.

37. The method of claim 26, in which determining the at least one keyword comprises:
    determining the at least one keyword using a voice recognition module.

38. The method of claim 26, in which determining the at least one keyword comprises:
    determining the at least one keyword using automatic speech recognition.

39. The method of claim 26, in which determining the at least one keyword comprises:
    receiving an indication of the at least one keyword via an interactive voice response unit.

40. The method of claim 26, in which the at least one keyword is determined by an agent.

41. The method of claim 26, further comprising:
    storing an indication of at least one keyword associated with the conversation.

42. The method of claim 41, in which determining the conversation comprises:
    determining the conversation based on the at least one keyword associated with the telephone call and the at least one keyword associated with the conversation.

43. The method of claim 26, further comprising:
    muting a portion of the conversation while the first caller is participating in the conversation.

44. The method of claim 26, further comprising:
offering the first caller an option to participate in the conversation involving the second caller.

45. The method of claim 26, further comprising:
before enabling the first caller to participate in the conversation,
transmitting a request to the first caller to provide a product identifier.

46. The method of claim 26, further comprising:
before enabling the first caller to participate in the conversation,
transmitting a request to the first caller to accept at least one term of use of the conversation.

47. The method of claim 26, further comprising:
arranging for the first caller to provide a benefit in exchange for participating in the conversation involving the second caller.

48. The method of claim 47, in which arranging for the first caller to provide the benefit comprises:
arranging for the first caller to provide the benefit before the first caller participates in the conversation.

49. The method of claim 47, in which arranging for the first caller to provide the benefit comprises:
arranging for the first caller to provide a payment.

50. A computer-readable medium storing instructions configured to direct a processor to perform the method of claim 26.

51. A device for processing a telephone call, comprising:
a processor; and
the computer-readable medium of claim 50, in communication with the processor.

52. A method comprising:
receiving a telephone call from a first caller;
determining a category of the telephone call;
determining at least one keyword associated with the telephone call;
determining a conversation involving a second caller; and
enabling the first caller to participate in the conversation involving the second caller,
in which the second caller placed a second telephone call to a call center, and
in which neither the first caller nor the second caller is an agent associated with the call center.

53. The method of claim 52, in which the first caller participates in the conversation by listening to the conversation.

54. The method of claim 52, in which the conversation comprises an in-progress call between the second caller and an agent associated with a call center.

55. The method of claim 52, in which the conversation comprises a recorded call between the second caller and an agent associated with a call center.

56. The method of claim 52, in which the conversation comprises a conversation between the second caller and at least one caller.

57. The method of claim 52, in which the conversation comprises a conversation between the first caller and the second caller.

58. The method of claim 52, further comprising:
arranging for the second caller to receive a benefit.

59. The method of claim 52, in which the telephone call from the first caller is in a queue.

60. The method of claim 52, in which determining the conversation comprises:
determining the conversation based on the category.

61. The method of claim 52, in which determining the conversation comprises:
determining the conversation based on the at least one keyword.

62. The method of claim 52, in which determining the conversation comprises:
determining the conversation based on the category and the at least one keyword.

63. The method of claim 52, in which determining the at least one keyword comprises:
determining the at least one keyword based on the category.

64. The method of claim 52, in which determining the at least one keyword comprises:
determining the at least one keyword using a voice recognition module.

65. The method of claim 52, in which determining the at least one keyword comprises:
determining the at least one keyword using automatic speech recognition.

66. The method of claim 52, in which determining the at least one keyword comprises:
receiving an indication of the at least one keyword via an interactive voice response unit.

67. The method of claim 52, in which the at least one keyword is determined by an agent.

68. The method of claim 52, further comprising:
storing an indication of at least one keyword associated with the conversation.

69. The method of claim 68, in which determining the conversation comprises:
determining the conversation based on the at least one keyword associated with the telephone call and the at least one keyword associated with the conversation.

70. The method of claim 52, further comprising:
muting a portion of the conversation while the first caller is participating in the conversation.

71. The method of claim 52, further comprising:
offering the first caller an option to participate in the conversation involving the second caller.

72. The method of claim 52, further comprising:
before enabling the first caller to participate in the conversation,
transmitting a request to the first caller to provide a product identifier.

73. The method of claim 52, further comprising:
before enabling the first caller to participate in the conversation,
transmitting a request to the first caller to accept at least one term of use of the conversation.

74. The method of claim 52, further comprising:
arranging for the first caller to provide a benefit in exchange for participating in the conversation involving the second caller.

75. The method of claim 74, in which arranging for the first caller to provide the benefit comprises:
arranging for the first caller to provide the benefit before the first caller participates in the conversation.

76. The method of claim 74, in which arranging for the first caller to provide the benefit comprises:
arranging for the first caller to provide a payment.

77. A computer-readable medium storing instructions configured to direct a processor to perform the method of claim 52.

78. A device for processing a telephone call, comprising:
a processor; and
the computer-readable medium of claim 77, in communication with the processor.

79. A device for processing a telephone call, comprising:
 means for receiving a telephone call from a first caller;
 means for determining a category of the telephone call;
 means for determining at least one keyword associated with the telephone call;
 means for determining a conversation involving a second caller; and
 means for enabling the first caller to participate in the conversation involving the second caller,
 in which the conversation comprises an in-progress call between the second caller and an agent associated with a call center, and
 in which the first caller is not an agent associated with the call center.

80. A device for processing a telephone call, comprising:
 means for receiving a telephone call from a first caller;
 means for determining a category of the telephone call;
 means for determining at least one keyword associated with the telephone call;
 means for determining a conversation involving a second caller; and
 means for enabling the first caller to participate in the conversation involving the second caller,
 in which the conversation comprises a recorded call between the second caller and an agent associated with a call center, and
 in which the first caller is not an agent associated with the call center.

81. A device for processing a telephone call, comprising:
 means for receiving a telephone call from a first caller;
 means for determining a category of the telephone call;
 means for determining at least one keyword associated with the telephone call;
 means for determining a conversation involving a second caller; and
 means for enabling the first caller to participate in the conversation involving the second caller,
 in which the second caller placed a second telephone call to a call center, and
 in which neither the first caller nor the second caller is an agent associated with the call center.

* * * * *